W. H. CHAPMAN.
MAGNETO GENERATOR.
APPLICATION FILED MAY 5, 1919.

1,416,789.

Patented May 23, 1922.
2 SHEETS—SHEET 1.

Inventor:
William H. Chapman
by S. W. Gates
Atty.

W. H. CHAPMAN.
MAGNETO GENERATOR.
APPLICATION FILED MAY 5, 1919.
1,416,789.
Patented May 23, 1922.
2 SHEETS—SHEET 2.
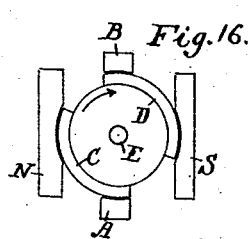
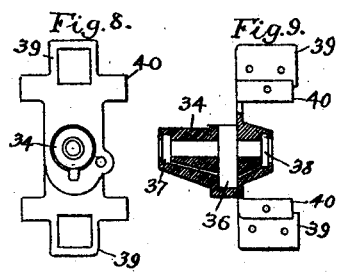
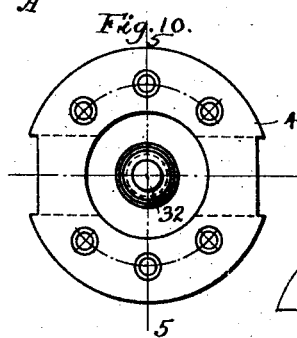
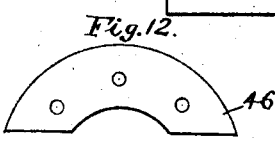
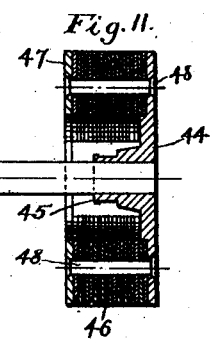
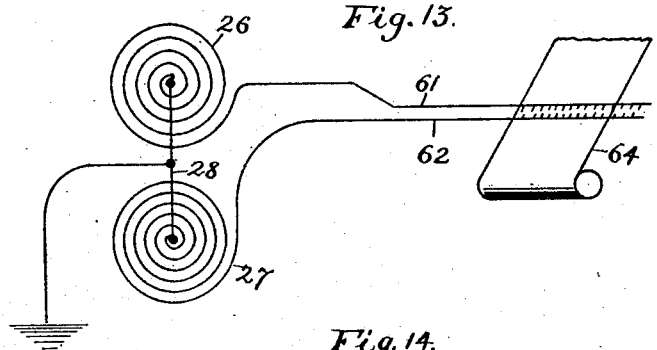
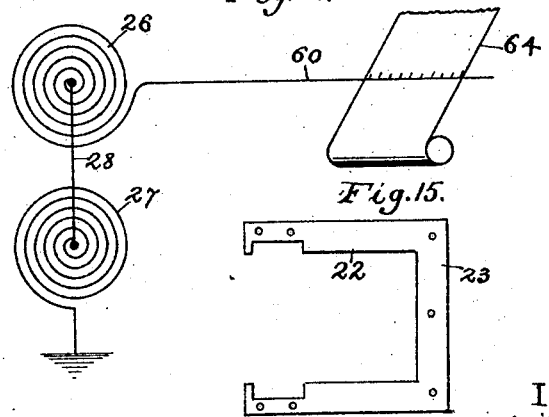
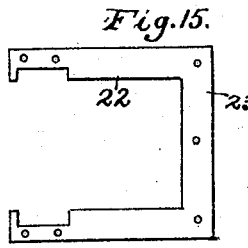
Inventor:
William H. Chapman
by S. W. Bates
Atty.

UNITED STATES PATENT OFFICE.

WILLIAM H. CHAPMAN, OF PORTLAND, MAINE.

MAGNETO GENERATOR.

1,416,789.  Specification of Letters Patent.  Patented May 23, 1922.

Application filed May 5, 1919. Serial No. 294,773.

*To all whom it may concern:*

Be it known that I, WILLIAM H. CHAPMAN, a citizen of the United States, residing at Portland, in the county of Cumberland and State of Maine, have invented certain new and useful Improvements in Magneto Generators, of which the following is a specification.

My present invention relates to a new means of generating the high potential alternating charges required for neutralizing static electricity in paper, wool, cotton, silk or other like substances in process of manufacture or printing, and in the carrying out of the method shown and claimed in my Patent 777,598 dated Dec. 13, 1904, and subsequent patents.

The invention involves the use of a magneto generator specially constructed for the purpose and combined with other features necessary to the neutralization of static charges, the magneto generator being of the class having fixed permanent magnets and induction coils with rotating pole pieces.

In magneto generators used for other purposes, the aim is to produce a considerable quantity of current. In generators used for ignition for instance, the aim is to produce disruptive discharges of considerable quantity and heating effect and it is immaterial whether the impulses are positive or negative.

My object on the contrary is to obtain impulsive charges alternately positive and negative and of such high potential and limited quantity as to cause only glow or corona discharges into the air from the surface of the naked conductors used to receive and distribute the charge.

With my improved magneto generator the quantity discharged is so limited that it will not set fire to any of the inflammable substances under treatment, among which must be reckoned fabrics in process of coating with rubber dissolved in naphtha.

According with my present invention, I make use of an inductor type of magneto generator in which the essential elements are a permanent magnet, and a fixed induction coil, and a pair of sectors of iron or other magnetic material mounted on a rotor revolving adjacent to the poles of the magnets.

The said sectors in the course of their revolution act alternately as pole pieces for the north and the south pole of said permanent magnet while approaching and receding from the pole ends of the electromagnet.

In the preferred form of my device, the induction coil has a laminated core to enable it to respond quickly to changes of magnetomotive force impressed upon it by the permanent magnet. The electro magnet has two coils of circular form to facilitate the winding and insulation of the numerous layers of wire from each other. The coils are placed as near to the ends of the induction coil as possible, while allowing room for the movement of the rotor.

I have illustrated in the accompanying drawing, one form of apparatus constructed according to my invention for neutralizing static electricity, but I desire it to be understood that other forms may be constructed which will come within the limits of my invention as defined in the claims.

Referring to the drawing.

Figure 6:
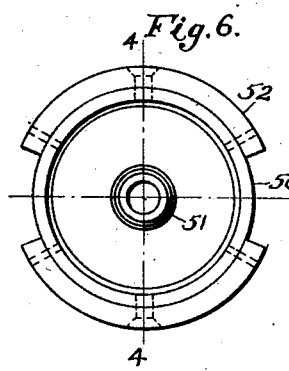
Figure 7:
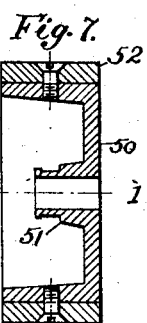
Figure 1:
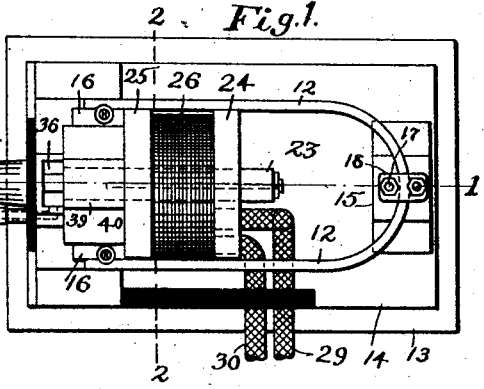
Fig. 1 is a plan of the magneto generator used in my apparatus.
Figure 4:
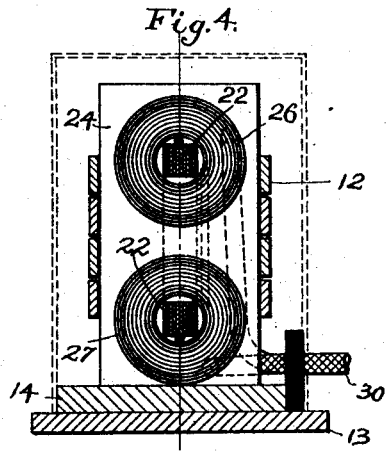
Figure 2:
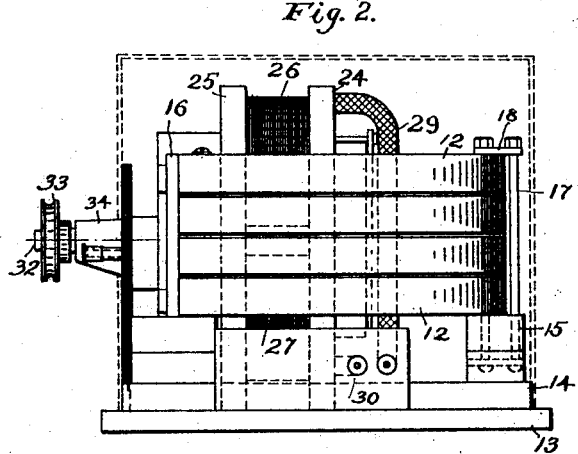
Fig. 2 is a side elevation.
Figure 5:
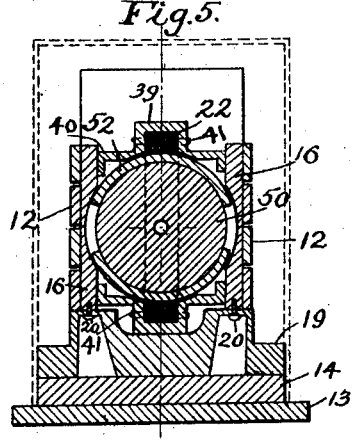
Figure 3:
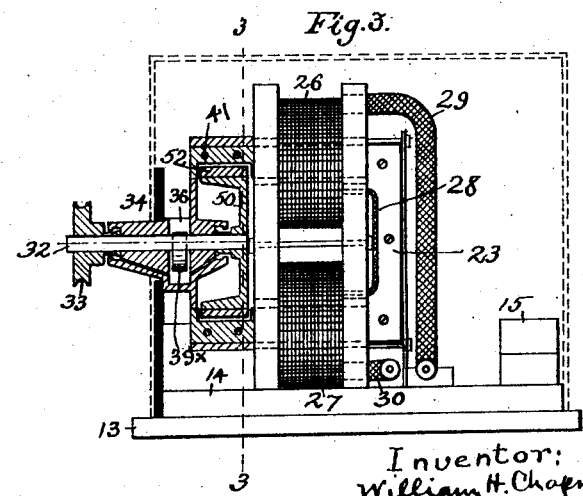

Fig. 3 is a side elevation partially in section on the line 1—1 of Fig. 1, omitting the permanent magnets, Fig 4 is a section on the line 2—2 of Fig. 1, Fig. 5 is a section on the line 3—3 of Fig. 3, Fig. 6 is a front elevation of the rotor, Fig. 7 is a section on the line 4—4 of Fig. 6, Fig. 8 is a front elevation of the frame of the machine, Fig. 9 is a side elevation of the same with the central portion in section, Fig. 10 is an end elevation of a modified form of rotor, Fig. 11 is a section on the line 5—5 of Fig. 10, Fig. 12 is a detail of one of the plates composing the periphery of rotor shown in Figs. 10 and 11, Fig. 13 is a diagram showing the application of my generator to one form of my neutralizer Fig. 14 is a diagram showing its application to another form of my neutralizer Fig. 15 is a plan of one of the plates making up the core of the induction coil being the central plate of said magnet, and Fig. 16 is a diagram illustrating the action of the generator.

Similar reference letters and figures throughout the drawings denote similar parts.

Referring to Figs. 1–9 and 15, 13 represents a foundation plate preferably of slate, and 14 is a base plate thereon of non-magnetic material, these parts forming the foundation of the machine.

The permanent magnet is in the form of a plurality of horse shoe magnets, horizontally disposed, and being preferably in four sections 12 laid one on top of the other.

As herein shown, the yoke ends of the magnets rest on a block 15 at one end of the base plate and the pole ends are held in contact with a vertical pole piece 16 by the spring of the magnets. Clamping bolts 17 and a clamping plate 18 hold the yoke ends of the magnets in place.

The vertical pole piece 16 is secured by its lower end on the top of a block 19 which is in turn secured to the base plate 14. Screws 20 extend upward through the block 19 and enter the lower end of the vertical pole piece 16, holding it firmly in place.

The induction coil is made up of two cores, and a yoke uniting their rear ends. The poles or forward ends of the cores are located between the two pole pieces of the permanent magnet, and are so disposed that all four of the poles will lie in the path of a rotor containing segments of magnetic material which act as rotating poles.

These segments act as herein shown by bringing the cylindrical rotating surface of the sectors or its perimeter into close magnetic relation with the inner faces of the poles.

As herein shown, the two cores 22 are united at their rear ends by a yoke 23, and the yoke and cores are laminated by being built up of a series of U-shaped iron plates (see Fig. 15).

The core 22 and the yoke 23 are thus practically integral and the several laminæ are bolted or riveted together to form the magnet.

The windings of the induction coil are clamped in position on the core by a pair of upright plates 24, 25 preferably of wood, each of the plates having a pair of openings through which the cores pass.

The coils 26 and 27 are here shown two in number and cylindrical in form being wound one on each pole. The axis of each coil is thus coincident with the axis of the core, and the two coils occupy the space between the plates 24 and 25.

In order to get the exceedingly high potential necessary to effect a glow or corona discharge from naked conductors such as is necessary for neutralizing static electricity by my process, I am obliged to make the coils of the electromagnet with a very great number of turns of fine insulated wire.

In practice each of the coils 26 and 27 contains about 70,000 turns of No. 38 enamel covered wire all contained in a space about 2 inches in length and about 4 inches outside diameter. This compactness would be impossible with wires insulated with cotton or silk coverings and it is the very compactness that makes it possible to secure the voltage required. By this compact construction the convolutions of the wire are kept within range of the inductive action of the core.

The great number of convolutions of fine wire by its resistance limits the quantity of current that can pass through so that the discharges are in the nature of glow discharges or a radiation of electric ions rather than sparks or disruptive discharges.

The wires of the two coils 26 and 27 are connected by a connecting wire 28. The insulated lead wire 29 connects with the outer end of the winding on the coil 26 and the insulated wire 30 connects with the end of the coil 27.

The rotor as here shown in made up of a flanged disk 50 of composition or other non-magnetic material and having one solid face with a central hub. On the periphery of the pulley two iron sectors 52 are mounted.

The flanged disk 50 is fixed on the inner end of a suitable shaft 32. This shaft may be driven by any suitable means, but I have here shown on its outer end a grooved pulley 33. For supporting the several fixed and movable parts of the magnets, I have provided a suitable frame which as herein shown is made of an integral casting of non-magnetic composition. In this casting are formed the journal bearings for the shaft 32, two sockets for securing the poles of the electromagnet and lugs for securing in place the pole pieces of the permanent magnet.

The central portion of the casting is formed into an elongated bearing 34 for the shaft 32. The bearing has a central oil chamber 36 with auxiliary oil chambers 37 and 38 near the ends of the bearing communicating with the central chamber by connecting passages for returning the oil from the shaft to the central oil chamber. (See Figs. 8 and 9).

A loose oiling ring 39× is provided to run in the oil chamber and on the shaft to keep the latter thoroughly oiled. The upper and lower ends of the casting have each a socket 39 extending rearwardly so as to receive the pole ends 22 of the electromagnet and to also inclose the rotor which is on the rear end of the shaft 32.

A pair of lugs 40 at each side of the casting shown as adjacent to the sockets, are provided for supporting the detachable pole pieces 16 of the permanent magnet.

The sockets 39 and the lugs 40 have holes in their sides for the reception of screws or rivets. The pole pieces 16 are secured in place against the lugs 40 by screws. The laminated core sections are secured in the sockets 39 by screw bolts 41 which pass through the sockets from side to side.

The lower ends of the pole pieces 16 rest on the block 19. The plates 24 and 25 are supported by the base 14 so that the structure is firmly held together and supported.

In Figs. 10, 11 and 12 I have illustrated a modified form of rotor in which segments are laminated whereby the reversal of polarity takes place more quickly than when the segment is made of a single piece.

The rotor is made up of the disk 44 having a hub 45 by which it is attached to the shaft 32. The segments 46 are cut from plates of soft iron or other magnetic material, and a sufficient number of the plates are placed face to face to make the necessary thickness for the segment with a binding plate 47 on the outside. The segments 46 are secured together by bolts 48 which pass through holes in the segment plates.

The inner faces of the pole pieces of the permanent magnets and the inner faces of the poles or core ends of the induction coil are shaped to conform to the outer surfaces of the segments so that each segment as it rotates just clears or sweeps the surfaces of the poles.

In Fig. 16 I have shown a diagram illustrating the operation of my magneto generator. In the diagram A and B are the poles of the induction coil, N and S the poles of the permanent magnet, C and D are the segments and E is the shaft of the rotor.

Assuming the rotor to be in the position shown in Fig. 16 the magnetic circuit will be as follows: from S through sector D to pole B of the induction coil, thence through the core to pole A, sector C to pole N.

When the sectors are revolved one quarter of a revolution in either direction from the position shown, the course of the magnetic lines of force is reversed through the core. Suppose for instance, that the revolution has been to the right as indicated by the arrow. The circuit will then be completed as follows:—pole S sector D, pole A, induction coil to pole B, sector C to pole N, thus reversing the direction of the circuit in the induction coil. Another quarter revolution will bring sector D into the position first occupied by sector C and vice-versa. A continuance of the revolution will cause a repetition of the same cycle of changes as to the direction in which the lines of magnetic force are threaded through the coils encircling the core.

By the well-known laws of electro-magnetic induction these changes excite in the coils electromotive forces of alternately opposite polarity. The polarity changes every quarter revolution, so that though the permanent magnet has only two poles there are twice that number of alternations in each revolution.

This fact enables me to obtain the required frequency and voltage at a much lower speed of revolution than would be the case if these changes were effected by the revolution of either of the magnets or of inductors as arranged in some other types of magneto generators. If the sectors C and D are laminated as above described they respond more quickly to changes of magnetomotive force delivered through them to the electromagnet.

It will be seen that the poles of the permanent, and the poles of the induction coil alternate, and the sectors as they rotate must be long enough to reach from each pole to the adjacent pole in order to get the effect described.

By forming the induction coil of two connected windings, I find the magneto will be adapted to be used with the two principal systems which I now use for neutralizing static electricity.

In one system I deliver the entire charge of electricity to a single wire or comb point conductor. The charge is in this instance alternately positive and negative, and the material acted on is continually bombarded with alternating positive and negative ions.

According to the other system I use two conductors placed adjacent to each other but far enough apart so that a glow discharge will take place between them. Each wire is charged with a charge of opposite sign from that on the other wire and the alternations are so arranged that at the instant one wire is positive the other wire will be negative. Thus by the last system only one half of the voltage is required that is required in the first system. In Figs. 13 and 14 I have illustrated the manner in which my magneto may be connected to operate either of these systems.

In Fig. 14, 64 represents a roll of paper under treatment for removing static electricity, and 60 is the discharging conductor effecting the glow discharge onto the paper.

I connect the conductor 60 with one end of the winding wire of my coils and ground the other end of the wire. In Fig. 13 I connect one of the discharging conductors 61 with one end of the coil wire and the conductor 62 with the other, and ground the connecting wire 28 which connects the windings of the two coils.

It will thus be seen that the magneto may be connected up with either my one wire or two wire systems without difficulty.

It is designed to place the magneto directly on the machine where the electricity is to be neutralized, either belting from the machine or using an electric motor.

While I have described my magneto as being specially designed to neutralize static electricity, it is evident that it may be used for any purpose where a glow or corona discharge is required.

I claim:

1. In a magneto generator, the combination of a shaft, a rotor on the end of said shaft having sectors on its periphery, a frame having a bearing for said shaft at one side of said rotor with a socket above and a socket below the rotor and laterally projecting lugs adjacent to said socket on each side, an induction coil core secured in each of said sockets, an upright pole piece secured to each of said lugs, coils on said cores, a yoke connecting their rear ends and a horse shoe magnet secured in a horizontal position to contact with the outer surfaces of said pole pieces, said poles and pole pieces conforming closely to the circular path of the outer surfaces of said sectors.

2. In a magneto generator, the combination of a shaft, a rotor at the end of the shaft, a frame having a pair of journals for said shaft formed with an intervening oil well, with a socket above and a socket below said rotor, a stud projecting laterally from each side adjacent to said sockets, an induction coil core secured in each of said sockets, a coil for each core, a yoke joining the rear ends of the cores, a base, a pair of upright magnet pole pieces secured to said base, and a permanent magnet secured in contact with the outside of said pole pieces, the inner surfaces of the core ends and pole pieces conforming closely to the circular path of the outer surfaces of said sectors.

3. A frame for supporting a magneto generator consisting of an integral casting having an elongated central shaft journal bearing with an oil reservoir intermediate its ends, a horizontal socket at its top and bottom and a pair of lateral lugs on each side.

4. In a magneto generator, a frame for supporting the working parts having an elongated journal bearing, a socket above and a socket below said bearing and projecting inwardly therefrom in combination with a shaft for said bearing, and a rotor on said shaft adapted to rotate in the space between said sockets.

In testimony whereof I affix my signature.

WILLIAM H. CHAPMAN.